Patented Nov. 25, 1952

2,619,474

UNITED STATES PATENT OFFICE 2,619,474

HYDROUS ALUMINA CATALYST SUPPORT

Carlos L. Gutzeit, Woodbury, N. J., assignor to Socony-Vacuum Oil Company, Incorporated, a corporation of New York No Drawing. Application November 28, 1950, Serial No. 198,040

3 Claims. (Cl. 252—438)

This invention relates to improved catalyst supports and to a process for preparing them. More particularly, the present invention is concerned with improved alumina supports for dehydrocyclization and aromatization catalysts and with a process for the preparation of these alumina catalyst supports.

As is well known to those familiar with the art, metal oxides which are active as dehydrocyclization and aromatization catalysts, such as chromia, are generally supported on alumina. These catalysts usually are prepared either by coprecipitation of the hydrous oxides or of other compounds which decompose to form the metal oxides under conditions of calcination, or by impregnation of alumina with aqueous solutions, such solutions being selected to avoid hydrolysis or other decomposition during the impregnation operation but which decompose under conditions of calcination to leave a residue which consists of the catalytically active metal oxides.

As is also well known, many of the commercially available aluminas having relatively high surface areas, such as gel-type alumina or "activated aluminas" consisting principally of gamma-alumina, have been used to prepare the impregnated catalysts. On the other hand, precipitated alumina has been prepared in accordance with many well established procedures suitable for the production of high surface area alumina utilizable as a catalyst support. Thus, for example, aluminum hydroxide has been initially precipitated using aqueous solutions of aluminum nitrate or aluminum sulfate and the hydroxides or carbonates of ammonium, sodium or potassium. Residual sodium or potassium ions have been reduced to negligible amounts by base-exchange with ammonium salts. Traces of residual sulfate or nitrate ions have been found to be harmless. Precipitation using a slight excess of alkali at a pH not exceeding 10 or using dilute solutions, of the order of 0.1 molar or less, has simplified or facilitated the washing out of anions. Freezing and thawing the gelatinous hydrous alumina has converted it to a more easily filterable or centrifugable material and has lowered its water-content, thereby facilitating washing. The addition of ammonium hydroxide or of neutral salts, such as ammonium nitrate, to the wash water has facilitated the removal of other ions and has prevented peptization of the alumina toward the end of the washing operation.

It has now been discovered that it is possible to obtain improved alumina catalyst supports through the use of cyanide, cyanate or thiocyanate ions during or immediately after the precipitation of the hydrous alumina by otherwise conventional precipitation methods. It has been found unexpectedly that these improved alumina catalyst supports are obtained only when relatively low concentrations of cyanide, cyanate or thiocyanate ions are used. The improvement in the alumina catalyst supports of the present invention is particularly manifested when the supports are utilized in conjunction with dehydrocyclization or aromatization catalysts such as chromia.

Accordingly, it is a broad object of the present invention to provide new compositions of matter. Another object is to provide alumina having a new surface. A further object is to afford improved catalyst supports. It is an important object to provide a process for preparing improved catalyst supports. It is a specific object to provide improved alumina catalyst supports. A more specific object is to provide improved aromatization and dehydrocyclization catalysts. It is a very specific object to provide improved alumina supports for dehydrocyclization and aromatization catalysts. Other objects and advantages of the present invention will become apparent to those skilled in the art from the following description.

Broadly stated, the present invention provides:

1. A process for the preparation of improved alumina catalyst supports, which comprises precipitating hydrous aluminum oxide or aging freshly precipitated hydrous aluminum oxide in the presence of controlled amounts of an anion selected from the group consisting of cyanide, cyanate and thiocyanate; and 2. The alumina obtained in accordance with the process defined in (1).

Little is known about the interaction of aluminum ions or hydrous alumina with cyanide, cyanate or thiocyanate ions. Aluminum forms coordination complexes readily. In the absence of coordination, these anions would be expected to behave much like chloride ions during the precipitation of hydrous metal oxides, i. e., they should be relatively weakly adsorbed by the hydrous metal oxides and those ions on the surface should be easily displaceable by polyvalent anions such as carbonate or sulfate. When present in relatively high concentrations, these anions would be expected to be good flocculating agents, and indeed, they are. As stated hereinabove, however, it has been found that when cyanide, cyanate or thiocyanate ions are present in relatively low concentrations, they alter the appearance of the precipitated hydrous alumina and, upon subsequent drying and calcination, impart an activating effect to the alumina.

In view of the foregoing, the concentrations of cyanide, cyanate or thiocyanate ions to be used vary from about 0.25 gram ion to about 2.0 gram ions, preferably, from about 0.50 gram ion to about 1.0 gram ion per gram molecular weight of alumina. Within this range, the presence of these anions, during the precipitation operation or during the aging of the freshly precipitated hydrous alumina, produces a hydrous alumina approaching the characteristics of an all-embracing gel. In higher concentrations, these anions function as flocculating agents and destroy the gel-like consistency of the precipitated alumina.

At the present time, the reasons for the improvement are not too well understood. If, as in the case of the cyanide, cyanate and thiocyanate ions, the adsorbed ions are destroyed completely by heat, oxidation, reduction or other treatments characteristic of the preparation and use of catalysts, the ultimate effect of these anions on catalytic activity can be attributed to only two effects:

1. An alteration in surface area.
2. An alteration in the nature of the catalyst surface.

Since tests have shown that the surface area is not increased, it must be assumed that the presence of these anions exerts some unknown effect upon the surface of the alumina which is advantageous from the standpoint that it imparts activity to the alumina as a catalyst support.

There appears to be nothing critical in the method of precipitating the hydrous alumina. In general, any method of precipitating the hydrous alumina known to the prior art can be utilized. It will be appreciated, however, by those familiar with the art, that acidic conditions cause volatilization or decomposition of cyanide, cyanate or thiocyanate ions. Accordingly, when the precipitation is effected in the presence of the cyanide, cyanate or thiocyanate ions, it is preferred to carry out the precipitation using an aqueous solution of an alkali metal aluminate, such as sodium aluminate, and nitric acid or hydrochloric acid. The solution should be free of flocculating ions.

On the other hand, when the hydrous alumina is initially precipitated in the absence of the cyanide, cyanate or thiocyanate ions, and then contacted with these ions, the hydrous alumina may be precipitated from any water-soluble aluminum salt and alkaline material, provided that neither is associated with strongly adsorbed or flocculating ions, such as carbonate or sulfate ions. From a practical standpoint, this limits the choice of aluminum salts to the nitrate, and the alkaline materials, to the hydroxides of ammonium, potassium and sodium.

Precipitation is effected, preferably, from relatively concentrated solutions such that the final slurry corresponds to from about 0.25 to about 1.0 molar alumina content. Higher concentrations are difficult to mix rapidly and uniformly. Lower concentrations lead to a thin slurry rather than one of gel-like consistency. The final pH of the hydrous alumina should be between about 7.5 and about 10, preferably, between about 8.5 and about 9.5.

Any water-soluble salt may be used as the source of cyanide, cyanate or thiocyanate ions. From a practical standpoint, this means either sodium or potassium cyanide, cyanate or thiocyanate. As stated hereinbefore, the anionic material may be added to any of the precipitants which is not acid (e. g., to sodium aluminate but not to aluminum nitrate), or it may be added to the freshly precipitated hydrous aluminum oxide before it has aged appreciably (i. e., within about two hours after precipitation). In the latter case, the relatively thin hydrous alumina slurry thickens to the consistency of whipped heavy cream. Apart from this, there appears to be nothing critical in the time of contact between the precipitated hydrous alumina and the cyanide, cyanate and thiocyanate ions.

The washing operation may be carried out in any manner known to the prior art. As is well known, the precipitated hydrous alumina is washed until it is substantially free of water-soluble impurities. Small amounts of residual sodium or potassium may be removed by base-exchange with a dilute aqueous solution of an aluminum or ammonium salt, or by addition of ammonium nitrate or hydroxide, for example, to the wash water.

Also as practiced by the prior art, the preliminary drying is carried out, preferably, at a relatively low temperature, for example, 70° C.–80° C. Calcination is effected by heating gradually up to a temperature of about 600° C. to about 750° C., to ensure obtaining a product having a relatively high surface area, and thereafter maintaining the alumina at such temperatures for a period of about 2 hours to about 12 hours. The finished product may be used in any of the conventional forms such as powder, pills, spheres, extrudates or irregular fragments, all of a size suitable for whatever subsequent desired use.

The alumina of the present invention may be used as a catalyst support for any of the metal oxides known to be active as dehydrocyclization or aromatization catalysts. As is well known, these oxides include those of the metals of groups V, VI, and VIII of the Periodic Table.

Impregnation of the alumina contemplated herein with salts of these metals is effected in accordance with conventional methods. Thus, for example, when chromia is the catalyst, compounds such as chromic acid, chromic nitrate, or chromic acetate, which decompose under normal conditions of calcination to leave a residue consisting essentially of chromia, are employed.

The following detailed examples are for the purpose of illustrating the present invention and to indicate the advantages thereof, and also, for the purpose of showing modes of embodying the invention. It must be appreciated, however, that the present invention is not to be construed as being limited to the specific catalysts, methods of catalyst preparation and evaluation, and specific manipulations and conditions set forth in the examples. As those skilled in the art will readily understand, numerous modifications and variations therein, all within the purview of the foregoing discussion, are possible, and, accordingly, must be considered to be encompassed by the scope of the present invention.

EXAMPLES 1, 2, 3 AND 4

*Catalyst preparation*

A. *Alumina base.*—In each case, alumina was precipitated in one mole batches, using the same procedure. A stock solution of sodium aluminate was obtained by dissolving commercial sodium aluminate in as small an amount of water as possible and the solution was stabilized by the addition of 25 ml. of glycerine per liter. This solution was filtered through glass wool and then analyzed for alumina and alkali content. A volume containing one mole equivalent of alumina (333 vol. of 6 molar sodium aluminate) was diluted to one liter and any addition to alter the nature of the final alumina made. These additives included none for the blank, one mole sodium cyanide (49 grams), one mole potassium cyanate (81.1 grams), and one mole sodium thiocyanate (81.1 grams). A 50 ml. aliquot was then titrated electrometically with 6N nitric acid to determine the amount of acid necessary to reduce the pH to 8.5. The calculated amount of acid (345 ml. to 470 ml.) was added rapidly with vigorous stirring to the remainder of the aluminate and the thick, gel-like slurry was allowed to age for about 18 hours. The preparations were then washed substantially free of water-soluble impurities and then base-exchanged with 0.1 N aluminum nitrate to remove residual sodium or potassium ions. The hydrous alumina was finally dried in an air stream at 80° C. for 24 hours, heated slowly up to a temperature of 600° C. over a four-hour period and maintained at this temperature for four hours. The calcined product was broken into 6- to 10-mesh granules and used as a catalyst support.

B. *Impregnation of alumina base.*—Each of the alumina bases was impregnated with an aqueous solution containing an amount of chromic acid and potassium nitrate equivalent to 0.1 mole $Cr_2O_3$ and 0.005 mole $K_2O$ per mole of alumina. The impregnating solutions were prepared by diluting with water suitable amounts of 2 molar chromic acid and 1.73 molar potassium nitrate to a volume just sufficient to be substantially completely absorbed by the catalyst support. This total volume was about 0.5 volume of solution per volume of alumina granules. The impregnated granules were dried overnight at a temperature of 600° C. over a four-hour period and then calcined for 2 hours at this temperature.

Catalyst evaluation

All catalyst evaluations were made in a conventional type of all-glass apparatus using 36 c. c. of catalyst in each test. Dehydrocyclization activity was tested by using n-heptane as the charge stock. The test conditions were:

Temperature _____°C__ 500
Pressure _____ Atmospheric
Liquid hour space velocity_____ 0.5
Length of run_____hours__ 2.5

Toluene formation was measured by refractive index. Correlation with mass spectrometer analyses showed that the effect of olefin formation on refractive index could be ignored within the range of aromatic formation encountered. In order to cancel out the effect of minor variations in surface area and apparent density of the catalysts, specific activity as well as conversion of heptane to toluene was calculated. Specific activity is defined as the number of moles of toluene produced per square meter of catalyst surface per hour ($\times 10^{-6}$).

Naphtha reforming evaluations were made in the same glass apparatus used for n-heptane tests. The test conditions were:

Temperature _____°C__ 510
Pressure _____ Atmospheric
Liquid hour space velocity_____ 0.5
Length of run_____hours__ 2.5

The charge stock was a low-boiling range, depentanized, straight-run naphtha fraction obtained from Oklahoma City crude. This naphtha is representative of a Mid-Continent paraffinic naphtha fraction which is difficult to upgrade by reforming. It has the following properties:

Initial boiling point, 70° C.
10% at 79.5° C.
50% at 88° C.
90% at 100° C.
End point, 120° C.
A. P. I. gravity 66.3°
A. S. T. M. bromine No. 1.5
A. S. T. M. aromatics 6.1 vol. %
CFRR octane No. 60

For convenience, the pertinent data are set forth in Tables I and II.

TABLE I

*Dehydrocyclization of n-heptane to toluene*

| Addition to Sodium Aluminate (Moles per mole $Al_2O_3$) | Surface Area of Support (M.²/gram) | Toluene in Product (Wt. percent) | Conversion of Heptane to Toluene (Wt. percent) | Specific Activity (Moles Toluene of sq. m./hr.) $\times 10^{-6}$ |
|---|---|---|---|---|
| None | 222 | 25 | 23.5 | 7.0 |
| 1.0 NaCN | 184 | 32.5 | 20 | 9.6 |
| 1.0 KOCN | 195 | 37 | 35 | 8.9 |
| 1.0 NaSCN | 195 | 40 | 26 | 11.2 |

TABLE II

*Reforming light straight-run Oklahoma City naphtha*

| Addition to Sodium Aluminate (Moles per Mole $Al_2O_3$) | $C_3$-free Gasoline | |
|---|---|---|
| | Yield, Vol. percent | CFRR Octane No. |
| None | 82.5 | 81 |
| 1.0 NaCN | 82 | 82 |
| 1.0 KOCN | 80.5 | 82 |
| 1.0 NaSCN | 80.5 | 83 |

The data in Table I show that the addition of cyanides, cyanates or thiocyanates to hydrous alumina during precipitation leads to the formation of supported chromia-alumina catalysts having increased dehydrocyclization activity. Since this increased activity is shown by the specific activities, which are independent of minor changes in catalyst surface, as well as the conversion of heptane to toluene, the addition of these anions, in accordance with the present invention, produced a beneficial change in the nature of the alumina surface. The data in Table II show that this improvement in activity for dehydrocyclization leads to an increase in activity for aromatization reforming activity, as shown by the higher octane number produced by the catalysts of this invention.

What is claimed is:

1. An improved catalyst support selected from the group consisting of (1) alumina obtained by the process which comprises effecting the precipitation of hydrous aluminum oxide in the presence of an anion selected from the group consisting of cyanide, cyanate and thiocyanate ions, in amounts varying between about 0.25 gram ion and about 2.0 gram ions per gram molecular weight of alumina, and (2) alumina obtained by the process which comprises effecting the precipitation of hydrous aluminum oxide and thereafter contacting the precipitated hydrous aluminum oxide, within about two hours after said precipitation, with an anion selected from the group consisting of cyanide, cyanate and thiocyanate ions, in amounts varying between about 0.25 gram ion and about 2.0 gram ions per gram molecular weight of alumina.

2. An improved alumina catalyst support obtained by the process which comprises effecting the precipitation of hydrous aluminum oxide in the presence of an anion selected from the group consisting of cyanide, cyanate and thiocyanate ions, in amounts varying between about 0.50 gram ion and about 1.0 gram ion per gram molecular weight of alumina.

3. An improved alumina catalyst support obtained by the process which comprises effecting the precipitation of hydrous aluminum oxide and thereafter contacting the precipitated hydrous aluminum oxide, within about two hours after said precipitation, with an anion selected from the group consisting of cyanide, cyanate and thiocyanate ions, in amounts varying between about 0.50 gram ion and about 1.0 gram ion per gram molecular weight of alumina.

CARLOS L. GUTZEIT.

REFERENCES CITED

The following references are of record in the file of this patent:

UNITED STATES PATENTS

| Number | Name | Date |
| --- | --- | --- |
| 2,419,186 | Harris et al. | Apr. 15, 1947 |